(12) United States Patent
Kaphengst et al.

(10) Patent No.: US 7,128,451 B2
(45) Date of Patent: Oct. 31, 2006

(54) INGRESS AND EGRESS LIGHTING INTEGRATED TO SUN VISOR SYSTEMS

(75) Inventors: Michael R Kaphengst, Leonard, MI (US); Olimpia Maria Hernandez, Birmingham, MI (US); Kevin M Hester, Rochester Hills, MI (US); Bruce R. Koch, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 10/874,120

(22) Filed: Jun. 22, 2004

(65) Prior Publication Data

US 2005/0281041 A1 Dec. 22, 2005

(51) Int. Cl.
*B60Q 3/02* (2006.01)
*F21S 4/00* (2006.01)
*F21Y 103/02* (2006.01)

(52) U.S. Cl. ..................... 362/492; 362/216
(58) Field of Classification Search ............... 362/492, 362/135–144
See application file for complete search history.

(56) References Cited

U.S. PATENT DOCUMENTS

| | | | | |
|---|---|---|---|---|
| 2,515,437 A * | 7/1950 | Bisch et al. ............... 362/136 |
| 3,375,364 A * | 3/1968 | Marcus ..................... 362/144 |
| 4,486,819 A * | 12/1984 | Marcus et al. ............ 362/492 |
| 4,999,746 A * | 3/1991 | Svensson .................. 362/492 |
| 5,283,720 A * | 2/1994 | Boerema et al. .......... 362/492 |
| 5,938,321 A * | 8/1999 | Bos et al. .................. 362/488 |
| 5,988,838 A * | 11/1999 | Rudenberg ................ 362/488 |
| 6,286,983 B1* | 9/2001 | Macher et al. ............ 362/487 |
| 6,435,593 B1* | 8/2002 | Welter ....................... 362/492 |
| 6,464,381 B1* | 10/2002 | Anderson et al. ......... 362/488 |
| 2002/0159270 A1* | 10/2002 | Lynam et al. ............. 362/492 |
| 2004/0052084 A1* | 3/2004 | Lin ............................ 362/135 |

* cited by examiner

*Primary Examiner*—Alan Cariaso
(74) *Attorney, Agent, or Firm*—Laura C. Hargitt

(57) ABSTRACT

An apparatus is provided for illuminating the interior of an automotive passenger vehicle for ingress and egress. The apparatus comprises a lighting device integrated into the periphery of a sun visor or similar object. The lighting device is typically activated by a remote entry device, a door opening, or by an interior switch. The apparatus is particularly applicable where overhead interior lighting is impractical, such as in convertibles and other types of vehicles with removable tops. The lighting device may be customized for color and intensity, as well as for physical configuration. The apparatus can also be used in lieu of conventional interior roof lighting as a manufacturing cost reduction.

12 Claims, 3 Drawing Sheets

US 7,128,451 B2

INGRESS AND EGRESS LIGHTING INTEGRATED TO SUN VISOR SYSTEMS

TECHNICAL FIELD

The present invention generally relates to automotive lighting, and more particularly relates to interior lighting in a passenger vehicle.

BACKGROUND

Present-day passenger automotive vehicles are generally equipped with at least two types of interior lighting. One type typically provides general illumination for ingress and egress, while another type usually provides focused light for reading maps and such. For general illumination, dome lamps are commonly located in a conventional roof interior, and/or roof rail lamps may be included along the side roof rail areas.

For unconventional roofs, such as convertible tops, targa tops, movable roofs and glass roofs, dome lamps and roof rail lamps may not be feasible. Typically, in these situations, other types of interior lighting are used for ingress and egress, such as rear view mirror reading lights. As previously noted, however, reading lights are typically focused, and do not generally provide a broad pattern of illumination.

Therefore, it is desirable to provide an alternative lighting arrangement that would be appropriate for ingress and egress illumination in vehicles with either conventional (fixed) or removable roof configurations.

Accordingly, it is desirable to provide an interior lighting device that can illuminate a passenger automotive vehicle interior for ingress and egress, regardless of the type of vehicle roof configuration. In addition, it is desirable to provide an interior lighting device that is convenient and economical to install. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices are provided for illuminating the interior of a passenger automotive vehicle having any type of roof configuration. One device comprises a lighting tube integrated into the periphery of the sun visor. An exemplary lighting tube is typically energized by the vehicle power source whenever a door is unlocked or opened. The exemplary lighting tube is also typically energized by the vehicle power source when an external entry device or an interior switch is activated.

An exemplary lighting tube may be in the form of a flexible light ribbon, or any similar type of lighting device appropriate for attaching to a sun visor. The light emanating from the exemplary lighting tube is typically in the form of general illumination for the interior of the vehicle. The exemplary lighting tube can be configured in a particular color, or may be color adjustable. Moreover, the exemplary lighting tube can be configured for adjustable intensity levels.

The exemplary lighting tube can provide general interior illumination for vehicles without conventional roofs, such as convertibles. In addition, the exemplary lighting tube configuration can be used in vehicles with conventional roofs as an alternative or supplemental lighting scheme to the typical dome and roof rail lighting installations.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of illuminating the interior of a vehicle. It is generally desirable that the vehicle interior is illuminated during passenger ingress and egress, as well as for other appropriate situations. When the vehicle is equipped with a conventional integrated roof structure, overhead lamps and/or side lighting are typically installed in the roof structure itself. When the vehicle is equipped with a removable roof, such as a convertible top, targa top, or other type of removable roof, the installation of overhead lamps or side lighting may not be feasible. Typically, vehicles with removable roofs depend on reading lights, such as rear view mirror lights, for ingress and egress illumination. This type of lighting is generally focused, however, and may not provide adequate illumination of the interior. As such, there is a need for an interior lighting configuration that is adaptable to any type of vehicle roof configuration, in order to provide the level of illumination typically desired for passenger ingress and egress.

Figure 1:
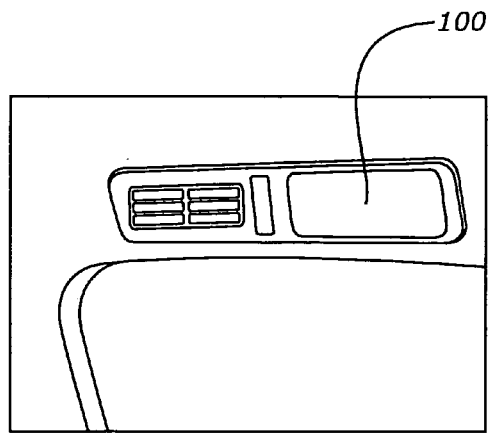
FIG. 1 is an illustration of exemplary roof rail lighting.
Figure 2:
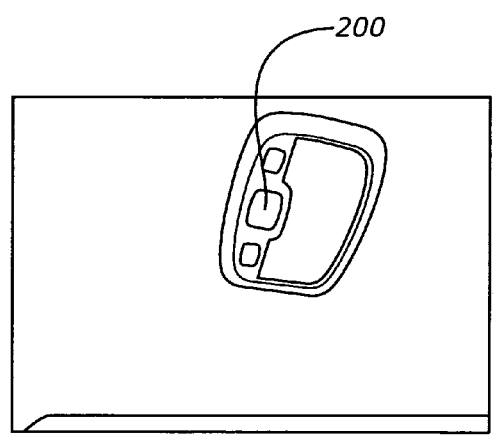
FIG. 2 is an illustration of exemplary dome lamp lighting.
Figure 3:
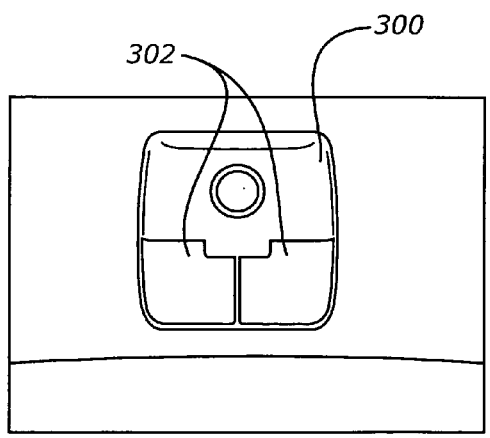
FIG. 3 is an illustration of exemplary overhead console lighting.
Figure 4:
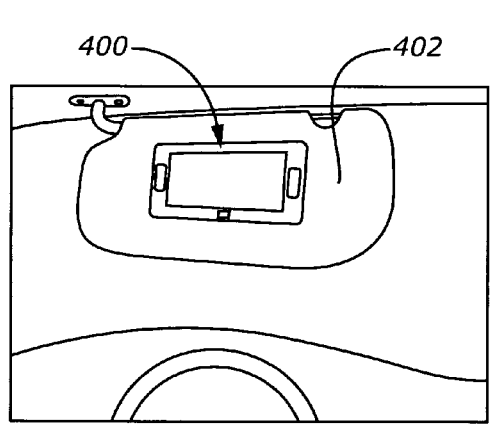
FIG. 4 is an illustration of exemplary vanity mirror lighting.

Typical examples of existing interior lighting schemes are illustrated in FIGS. 1–4. FIG. 1 depicts a lighting installation 100 on a side roof rail. FIG. 2 shows a dome lamp 200 mounted on the underside of the roof. FIG. 3 illustrates an overhead console 300 that includes a lighting arrangement 302 in addition to other accessories. FIG. 4 depicts a lighted vanity mirror 400 installed in a sun visor 402. Other types of interior illuminating configurations are also used, but they are typically installed in the roof structure, and may not be compatible with a removable roof application.

Of the previously described lighting examples (FIGS. 1–4), only the vanity mirror configuration (400 in FIG. 4) is independent of a typical roof structure. That is, vanity mirror 400 is integrated within sun visor 402, which is generally available on any vehicle, regardless of the type of roof arrangement. However, the lighting typically used for a vanity mirror configuration is generally not suitable for illuminating an entire passenger compartment. That is, for ingress and egress lighting, it is desirable to illuminate the seats and floor of a vehicle with a relatively high degree of lighting, e.g., in the approximate range of 5 to 10 lux (lumens per square meter). Therefore, a different type of light configuration is disclosed herein that can be integrated into a sun visor to provide the desired ingress and egress interior illumination, which would be applicable for any type of vehicle roof arrangement.

Figure 5:
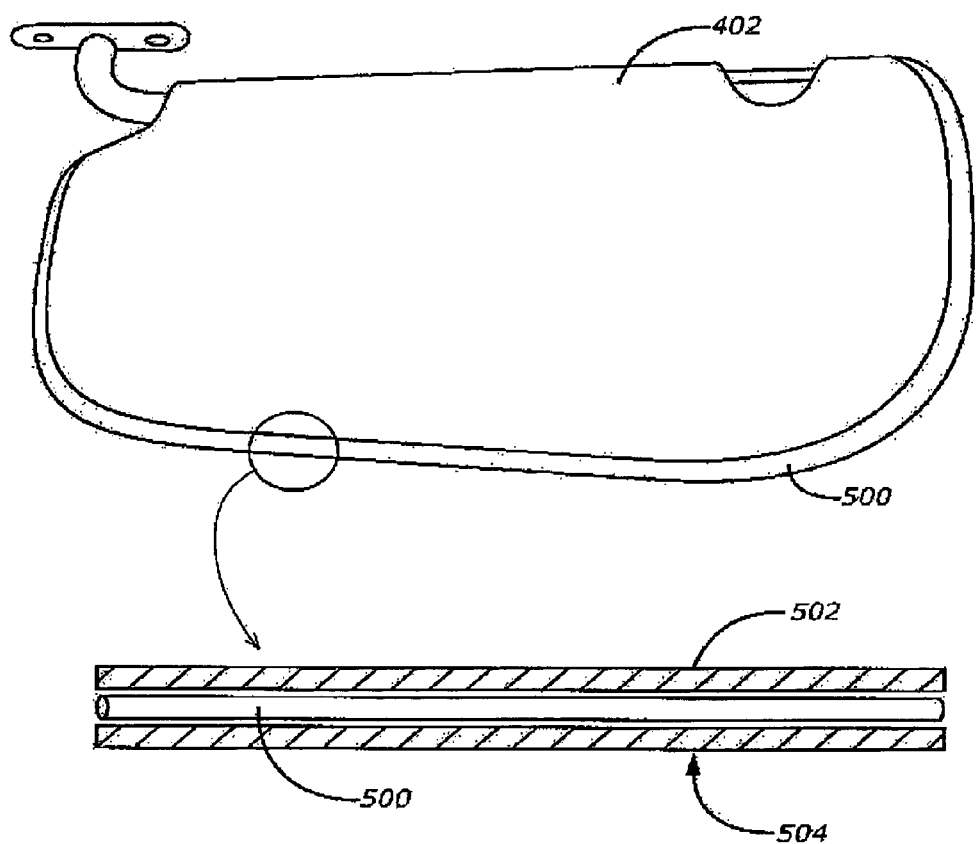
FIG. 5 is an illustration of an exemplary embodiment of tube lighting integrated into the periphery of a sun visor.

According to an exemplary embodiment of an interior illumination scheme for a vehicle with any type of roof configuration, a flexible or pre-configured lighting device, such as a light tube, light ribbon, or light channel, is typically integrated into the periphery of a sun visor, as illustrated in FIG. 5. In the FIG. 5 example, a flexible light tube 500 is attached by adhesive, or any other suitable technique, to the periphery of sun visor 402. A typical configuration is depicted in section A, showing light tube 500 positioned between the upper layer 502 and the lower layer 504 of sun visor 402. Furthermore, FIG. 5 shows flexible light tube 500 extending along a majority (i.e., 50% or more) of the periphery of sun visor 402. Upper layer 502 can be any suitable material, such as fabric, while lower layer 504 can be the same material, or may be a different material.

Although not illustrated in FIG. 5, lighted vanity mirror assembly 400 can also be installed in sun visor 402 without interfering with light tube 500. Moreover, light tube 500 can utilize the same wire packages and routing as vanity mirror 400, thereby simplifying the manufacturing process for the two devices. An exemplary lighting device, such as light tube 500, can be installed at the factory as a standard accessory, or as an option. Alternately, an exemplary lighting device can be installed as an after market option, either by a dealer or an accessory shop. Lighting devices of this type are generally available in a variety of configurations. One such device, for example, is the "dio" light, from Showers International Pty Ltd, which can be configured as a ribbon, a channel, or a tube. This product is currently available in several colors and sizes, and provides a bright lighting effect with relatively little power required.

While the exemplary embodiment described above represents one type of lighting device configuration, i.e., a light tube integrated into a sun visor, other embodiments are also possible. For example, an exemplary lighting device could be attached to a different part of the vehicle, other than a sun visor, that is not dependent on a fixed roof structure, such as e.g., a door sill plate, a center stack area, a floor console, and the like. Even when a vehicle has a fixed roof structure, exemplary lighting devices as described herein could be used to replace a conventional dome lamp or roof rail light fixture in order to reduce manufacturing assembly costs, since the conventional roof/rail lights typically require the installation of dedicated brackets during the vehicle assembly process.

An exemplary lighting device, such as light tube 500, is typically energized by a low voltage source, such as a standard 12-volt car battery. A switching arrangement is generally used to connect the voltage source to the light tube, upon the receipt of an appropriate signal. For example, a remote entry device that unlocks the vehicle doors will typically activate the light tube simultaneously. Also, a coded external entry system will typically activate the light tube as well. Other types of actions that would energize the light tube would typically include opening the doors from inside the vehicle, or activating an interior illumination switch.

Figure 6:
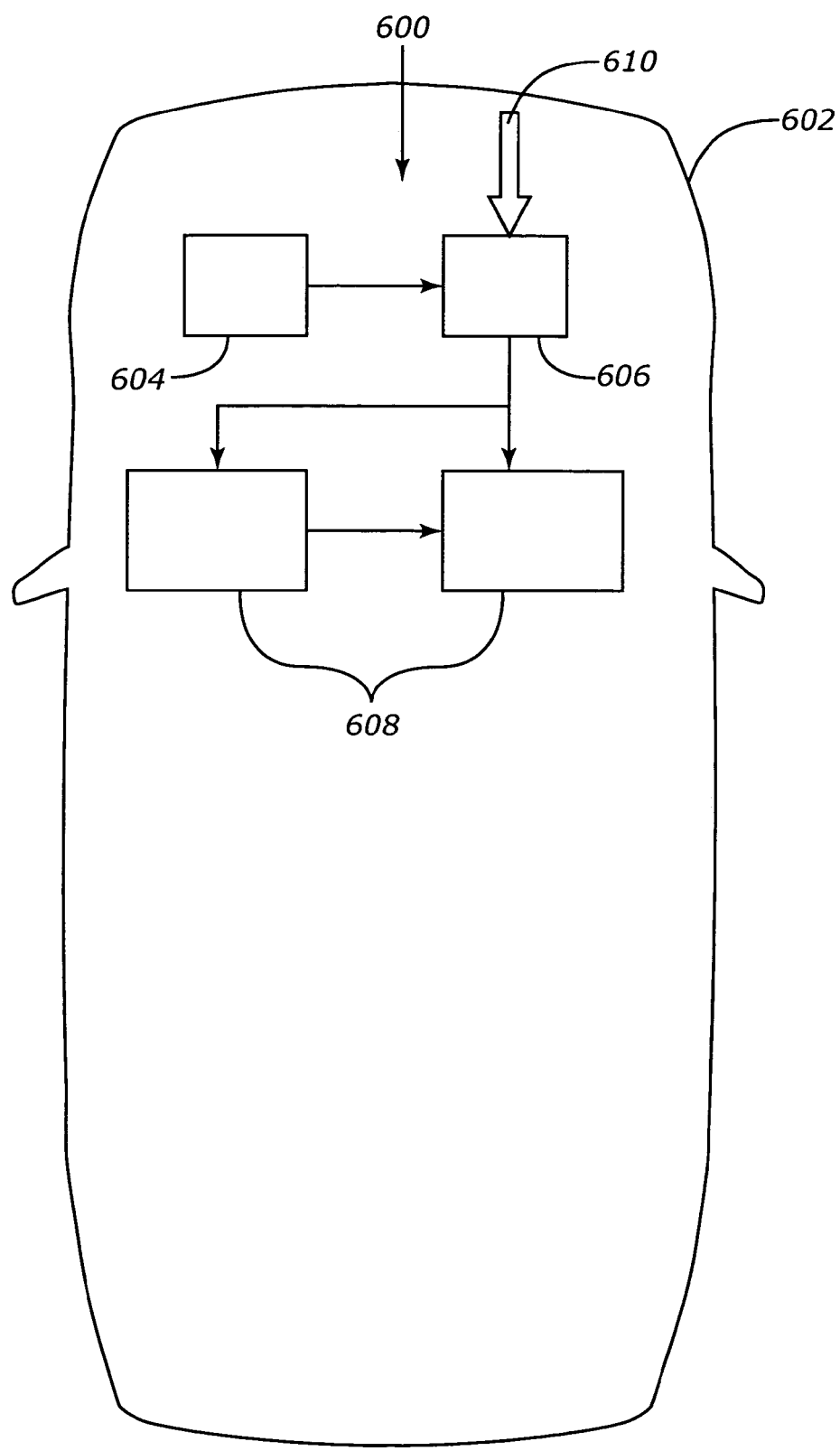
FIG. 6 is a simplified block diagram of an exemplary lighting arrangement.

An exemplary embodiment of a simplified lighting scheme is illustrated in FIG. 6. An ingress/egress lighting arrangement 600 for a vehicle 602 typically includes a power source 604, a sensing/switching circuit 606, and one or more exemplary light tube(s) 608 (e.g., one for each sun visor). When sensing/switching circuit 606 receives an appropriate input 610, as described above, it electrically couples power source 604 to light tube(s) 608. Sensing/switching circuit 606 typically includes sensors and logic circuitry suitable for receiving any appropriate activating signal 610, and for subsequently implementing the electrical connection between power source 604 and light tube(s) 608.

Sensing/switching circuit 606 can also be configured to include logic circuitry capable of adjusting the intensity of light tube(s) 608, and possibly the color of light tube(s) 608. As noted previously, light tube(s) 608, or similar devices, can generally be obtained in a range of colors and physical configurations, in accordance with the desired illuminating effect.

Accordingly, the shortcomings of the prior art have been overcome by providing an improved lighting arrangement for a vehicle interior. Where roof lighting or roof rail lighting is not feasible, as in a vehicle with a removable top, an exemplary embodiment of a lighting device can be attached to the periphery of one or more sun visors, or to similar objects, in order to provide general illumination of the vehicle interior. The exemplary lighting device can be activated for ingress and egress, as well as for any other purpose, by appropriately configured sensors and switches.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for illuminating the interior of a vehicle comprising:
    at least one sun visor, the sun visor comprising:
        an upper layer counted to a lower layer, and
        a periphery formed between the upper layer and the lower layer;
    a lighting device integrally formed within a majority of the periphery of the sun visor;
    a power source configured to energize the lighting device; and
    a switching device configured to electrically couple the power source to the lighting device, wherein the lighting device illuminates the vehicle interior when the switching device is activated.

2. The system of claim 1 wherein the lighting device provides an illumination level in the approximate range of 5 to 10 lumens per square meter for the interior of the vehicle.

3. The system of claim 2 wherein the lighting device comprises a series of lights integrated into a flexible ribbon configuration.

4. The system of claim 2 wherein the lighting device comprises a series of lights integrated into a tube configuration.

5. The system of claim 2 wherein the lighting device comprises a series of lights integrated into a channel configuration.

6. The system of claim 1 wherein the switching device is activated when a door of the vehicle is opened.

7. The system of claim 1 wherein the switching device is activated when a door of the vehicle is unlocked.

8. The system of claim 1 wherein the switching device is activated by an interior switch.

9. The system of claim 1 wherein the switching device is activated by an external control device.

10. The system of claim 2 wherein the lighting device has an adjustable color.

11. The system of claim 2 wherein the lighting device has an adjustable intensity.

12. A sun visor having an integrated lighting device for illuminating the interior of a vehicle, comprising:
   a sun visor having an upper layer coupled to a lower layer, wherein a periphery is formed between the upper layer and the lower layer; and
   a lighting device integrated within a majority of the periphery of the sun visor, wherein the lighting device provides a level of illumination for the vehicle interior in the approximate range of 5 to 10 lumens per square meter.

* * * * *